United States Patent [19]
DeGrazia

[11] 3,901,363
[45] Aug. 26, 1975

[54] CLUTCH ACTUATING CABLE WITH ADJUSTER

[75] Inventor: Victor S. DeGrazia, Dearborn, Mich.

[73] Assignee: Ford Motor Company, Dearborn, Mich.

[22] Filed: July 31, 1974

[21] Appl. No.: 493,309

Related U.S. Application Data

[62] Division of Ser. No. 413,160, Nov. 5, 1973, Pat. No. 3,859,866.

[52] U.S. Cl................................ 192/110 R; 192/99 S
[51] Int. Cl.² ........................................... F16D 21/04
[58] Field of Search............ 192/110 R, 111 R, 99 S

[56] References Cited
UNITED STATES PATENTS

| | | | |
|---|---|---|---|
| 3,795,295 | 3/1974 | Reno | 192/110 R |
| 3,800,929 | 4/1974 | Morris | 192/111 A |

*Primary Examiner*—Benjamin W. Wyche
*Attorney, Agent, or Firm*—Clifford L. Sadler; Keith L. Zerschling

[57] ABSTRACT

This disclosure relates to a clutch actuating system having means for establishing initial free play without using an external gauge. A clutch system in accordance with this invention may have a clutch pedal, a clutch release lever and a Bowden wire assembly interconnecting the pedal and the lever. The sheath portion of the Bowden wire has one of its ends secured to a bracket adjacent the clutch release lever. The other end of the sheath is secured to the vehicle fire wall adjacent the clutch pedal where an externally threaded fitting in the second end of the sheath fits within a tubular housing bolted to the fire wall. The end of the tubular housing has four angularly spaced apart slots in its end face. A special adjustment nut on the threaded fitting has four axially extending projections arranged to engage the tubular housing. During initial installation of the clutch actuating mechanism, the adjustment nut is rotated to remove slack in the Bowden wire. When the nut is tightened finger tight and no more slack remains in the Bowden wire assembly, the projections on the nut will engage the end of the tubular housing. The nut is then turned through a few degrees in either direction until the projections drop into the slots in the end of the tubular housing. The adjustment nut is then pulled into seated engagement with the end of the housing and held by a spring clip. The length of the projections provides and assures the appropriate amount of free play in the clutch actuating system.

4 Claims, 7 Drawing Figures

PATENTED AUG 26 1975 3,901,363
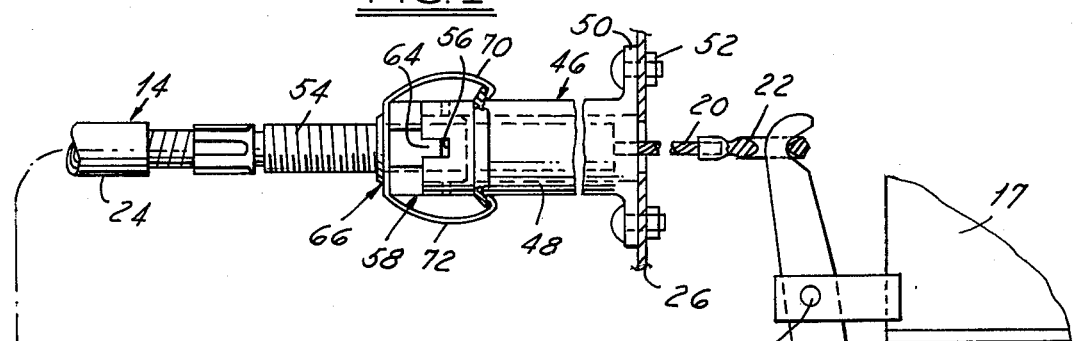
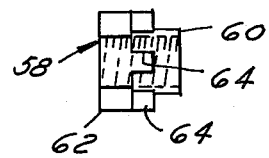
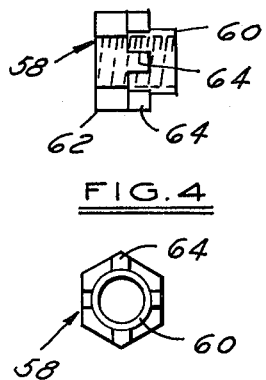
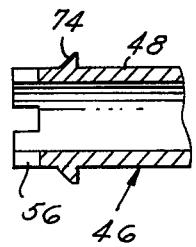
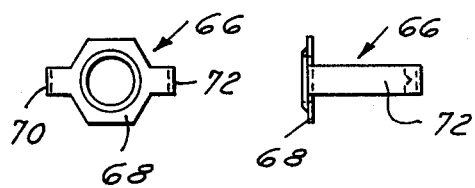
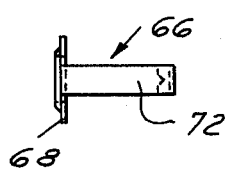

CLUTCH ACTUATING CABLE WITH ADJUSTER

This is a division of application Ser. No. 413,160, filed Nov. 5, 1973, and now U.S. Pat. No. 3,859,866.

BACKGROUND OF THE DISCLOSURE

The present invention relates to a Bowden wire type clutch actuating mechanism for a motor vehicle and, more particularly, to a clutch actuating mechanism that is constructed to automatically establish an appropriate amount of initial free play without using an external gauge.

In conventional clutch actuating systems employing Bowden wire actuators, it is common practice to establish free play by applying a force to the Bowden wire assembly until the clutch release bearing is in firm contact with the clutch release fingers of the pressure plate assembly. The jam nut securing one end of the Bowden wire sheath is then backed off a desired amount and locked in position. The amount that the jam nut is backed off determines the free play. In order to provide the proper level of free play, a gauge must be used to measure the distance which the nut is backed off.

It is the principal object of the present invention to provide a clutch actuating system of the Bowden wire type that automatically establishes the amount of initial free play without the use of an external gauge.

BRIEF SUMMARY OF THE DISCLOSURE

In accordance with the presently preferred embodiment of this invention, a clutch actuating system is provided for a motor vehicle that permits initial free play to be automatically established upon installation of the system without the use of an external gauge.

In the presently preferred embodiment, the clutch pedal is connected to a clutch release lever by a Bowden wire assembly. The sheath portion of the Bowden wire has one end secured by a pair of jam nuts to a stationary bracket adjacent to the clutch release lever. The other end of the Bowden sheath has an externally threaded end fitting that fits within a tubular housing member rigidly secured to the vehicle's fire wall. The forwardly facing end of the tubular housing has four angularly spaced apart slots. A specially constructed adjustment nut is threadedly received on the end fitting of the sheath and has a pilot portion extending into the tubular housing. The nut has four spaced projections that extend in a rearward direction.

The Bowden wire assembly is installed in the motor vehicle by connecting the flexible cable to the clutch pedal and to the clutch release lever. The pair of jam nuts are used to secure one end of the sheath to the stationary bracket adjacent the clutch release lever. The threaded fitting at the other end of the sheath is positioned within the tubular housing. The adjustment nut is tightened by hand to remove all slack in the system and to bring the clutch release lever into firm contact with the clutch release bearing. With all free play removed from the system, the projections on the nut will be in engagement with the end of the tubular housing. The adjustment nut is then rotated through a few degrees until the projections drop into the slots on the end of the housing. This will permit displacement of the sheath by an amount equal to the length of the projections. A special spring clip is then used to hold the nut in firm contact with the tubular housing.

This arrangement will automatically provide the desired amount of initial free play in the clutch system. The free play will be determined by the length of the projections on the adjustment nut. By merely removing the slack in the system and then seating the nut in proper engagement with the end of the housing, appropriate free play is provided in the clutch actuating system without the use of an external gauge.

BRIEF DESCRIPTION OF THE DRAWINGS

The many objects and advantages of a clutch actuating system constructed in accordance with this invention will become apparent upon consideration of the following detailed description and the accompanying drawings, in which:

FIG. 1 is a schematic view of a clutch actuating system embodying the present invention;

FIG. 2 is a view of the adjustment end of the Bowden wire assembly of FIG. 1 prior to adjustment;

FIG. 3 is a side elevational view, partly in section, of the adjustment nut;

FIG. 4 is an end view of the adjustment nut of FIG. 3;

FIG. 5 is an elevational view, partly in section, of the end of the tubular support housing;

FIG. 6 is an end view of the spring clip constructed to hold the adjustment nut in engagement with the tubular housing; and FIG. 7 is a side view of the spring clip.

DETAILED DESCRIPTION OF THE PREFERRED EMBODIMENT

Referring now to the drawings, wherein the presently preferred form of this invention is illustrated, FIG. 1 discloses a clutch actuating system that includes a clutch pedal 10, a clutch release lever 12 and a Bowden wire assembly 14 that operatively interconnects the pedal 10 with the release lever 12.

The pedal 10 is pivotally supported at 16 upon vehicle body structure 17. The lower end of the pedal 10 is provided with a pedal pad 18 for engagement by a vehicle operator. The upper end of the pedal 10 is connected by means of a clevis 22 to a flexible cable 20 which forms a portion of the Bowden wire assembly 14.

The flexible cable 20 is slidably supported in a flexible sheath 24. The upper end of the sheath is secured to the fire wall 26 of the vehicle by means which will be described below. The lower end of the sheath 24 has a threaded portion 28 that extends through an aperture in a support bracket 30. The bracket 30 is situated in proximity to the clutch release lever 12. A pair of threaded jam nuts 32 and 34 are situated on either side of the bracket 30 and secure the threaded end 28 of the sheath 24 to the bracket.

The lower end of the flexible cable 20 extends from the end 28 of the sheath 24 and through an aperture in the end of the clutch release lever 12. A ball shape stop member 36 is affixed to the end of the cable 12. A coil spring 38 is interposed between the end of the threaded portion 28 and the lever 12. The spring 38 urges the lever 12 into engagement with the stop 36.

The clutch release lever 12 is a lever of the second class with its upper end pivotally supported on a stationary fulcrum member 40 of the clutch assembly. The clutch release lever 12 engages a clutch release bearing 42 which, in turn, is constructed to engage fingers 44 of a clutch pressure plate assembly. The clutch assembly is spring pressed to a normally engaged condition. When the release lever 12 is pivoted in a clockwise direction (as seen in FIG. 1), the release bearing 24 causes the release fingers 44 to move in a direction that disengages the clutch.

In order to provide a proper level of free play in the clutch assembly, the present invention provides a means for establishing initial free play upon installation of the Bowden wire assembly 14 without the use of an external gauge.

A support housing 46 having a tubular body portion 48 and a flanged rearward end 50 is secured to the fire wall 26 by means of bolts 52. The upper end of the sheath 24 has a threaded fitting 54 secured thereto. The tubular portion 48 of the housing 46 surrounds the flexible cable 20 and the threaded fitting 54 of the sheath. As seen in FIG. 5, the forward end of the tubular housing portion 48 is provided with four slots or notches 56 that are spaced 90° apart.

A specially constructed adjustment nut 58 is threadedly received on the threaded fitting 54. The nut 58 has a pilot portion 60 that is arranged to extend into the interior of the tubular portion 48 of the housing 46. The nut 58 has a hexagonal head 62 and a series of four spaced apart projections 64 that extend in a rearward direction.

OPERATION

In operation, the Bowden wire assembly 14 is installed in a vehicle by securing the ends of the cable 20 to the clutch pedal 10 and the clutch release lever 12. The lower end of the sheath 24 is rigidly secured to the bracket 30 by tightening the jam nuts 32 and 34.

In order to provide the proper amount of initial free play in the clutch actuating system, the special adjustment nut 58 is threaded on the threaded fitting 54 in a direction bringing it into engagement with the end of the tubular portion 48 of the housing 46. The nut 58 is tightened by hand until all slack is removed from the system and the projections 64 bear against the end of the tubular portion 48. The nut 58 is tightened to the extent necessary to bring the release bearing 42 into contact with the release fingers 44. At this point, all free play in the clutch actuating system has been removed. The nut 58 will be oriented with respect to the end of the tubular housing 48 as shown in FIG. 2.

In order to complete the installation, the adjustment nut 58 is rotated through a few degrees until the projections 64 align with the slots 56 in the tubular portion 48. The nut 58 is then moved to a seated position as shown in FIG. 1. Due to the interengagement between the projections 64 and the slots 56, the nut 58 and sheath 24 are able to move through a distance equal to the length of the projections 64 when the nut 58 is seated.

A spring clip 66 is provided to hold the nut 58 against the end of the housing 46 during normal operation of the vehicle. The clip 66 has an annular base portion 68 that surrounds the threaded fitting 54. The clip 66 also has a pair of arcuate spring arms 70 and 62 that terminate in hook shape ends.

When the nut 58 is moved to the seated position against the end of the tubular housing 48 as shown in FIG. 1, the spring clip 66 is drawn up against the nut 58. The hook shape ends of the spring arms 70 and 72 are then brought into cooperative engagement with an annular flange 74 formed on the exterior of the tubular housing portion 48. The spring clip 66 is thus constructed to hold the nut 58 in engagement with the slotted end of the tubular housing portion 48.

Thus, the axial length of the projections 64 determines the amount of free play in the system when the adjustment nut 58 is moved from its FIG. 2 position where no free play is present to its FIG. 1 position where the predetermined level of free play is provided.

The foregoing description presents the presently preferred embodiment of this invention. Modifications and alterations may occur to those skilled in the art that will come within the scope and spirit of the following claims.

I claim:

1. A motor vehicle clutch actuating mechanism having a clutch free play establishing means;
   said clutch actuating mechanism including a clutch pedal, a clutch release lever and a flexible cable operatively interconnecting said pedal and said lever;
   support means supporting said flexible cable;
   a stationary support structure;
   adjustment means constructed to connect said support means to said support structure;
   said adjustment means including an adjustment element connected to said support means;
   said adjustment element having an axially extending gauge portion;
   said support structure having a gauge receiving portion;
   said adjustment element being displaceable from a first position wherein said gauge portion engages said support structure and said gauge portion is spaced apart from said gauge receiving portion to a second position wherein said gauge portion is seated in said gauge receiving portion;
   retaining means constructed to hold said adjustment element in engagement with said support structure when said gauge portion is seated in said gauge receiving portion.

2. A motor vehicle clutch actuating mechanism according to claim 1 and including:
   said retaining means including a resilient means constructed to exert a spring force on said adjustment element urging said element into engagement with said support structure.

3. A motor vehicle clutch actuating mechanism including a clutch pedal, a clutch release lever and a flexible cable operatively interconnecting said pedal and said lever;
   a flexible sheath supporting said flexible cable;
   said sheath having a threaded end portion;
   a support member having a bore therein;
   an adjustment nut threadedly engaging said end portion;
   said nut having a plurality of spaced apart projections on one side thereon;
   said support member having a plurality of projection receiving recesses;
   said nut being displaceable from a first position wherein said projections engage said support member and are spaced apart from said recesses to a second position wherein said projections are seated in said recesses;
   retaining means constructed to hold said nut in engagement with said support member when said projections are seated in said recesses.

4. A motor vehicle clutch actuating mechanism having a clutch free play establishing means;

said clutch actuating mechanism including a clutch pedal, a clutch release lever and a flexible cable operatively interconnecting said pedal and said lever;

a flexible sheath supporting said flexible cable;

said sheath having a threaded end portion;

a stationary support member having a tubular portion;

an adjustment nut threadedly engaging said end portion;

said nut having a plurality of spaced apart projections on one end thereof;

said tubular portion having a plurality of projection receiving recesses on one end thereof;

said nut being displaceable from a first position wherein said projections engage said tubular portion, are spaced apart from said recesses and there is no free play in said clutch actuating mechanism to a second position wherein said projections are seated in said recesses and a predetermined amount of free play is provided in said clutch actuating mechanism;

resilient means constructed to hold said nut in engagement with said tubular portion when said projections are seated in said recesses;

said projections being of a length to establish said predetermined amount of free play in said clutch actuating mechanism when said nut is displaced from said first position to said second position.

* * * * *